United States Patent
Delker et al.

(10) Patent No.: US 8,498,657 B1
(45) Date of Patent: Jul. 30, 2013

(54) USER INTERFACE UPDATE SIGNALING

(75) Inventors: Jason R. Delker, Olathe, KS (US); John M. Everson, Leawood, KS (US); Sei Y. Ng, Olathe, KS (US); Jason K. Whitney, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 324 days.

(21) Appl. No.: 12/483,135

(22) Filed: Jun. 11, 2009

(51) Int. Cl.
*H04W 4/00* (2009.01)
*H04M 3/42* (2006.01)
*G06F 3/00* (2006.01)
*G06F 3/048* (2006.01)

(52) U.S. Cl.
USPC ........ 455/466; 455/414.1; 715/700; 715/763; 715/810

(58) Field of Classification Search
USPC ........................................................ 455/466
See application file for complete search history.

(56) References Cited

U.S. PATENT DOCUMENTS

| | | | | |
|---|---|---|---|---|
| 6,121,923 | A * | 9/2000 | King | 342/357.42 |
| 7,548,745 | B2 * | 6/2009 | Amin | 455/413 |
| 2005/0120655 | A1 * | 6/2005 | Wolff et al. | 52/311.1 |
| 2007/0082707 | A1 * | 4/2007 | Flynt et al. | 455/564 |
| 2007/0106739 | A1 * | 5/2007 | Clark et al. | 709/206 |
| 2009/0164928 | A1 * | 6/2009 | Brown et al. | 715/767 |
| 2009/0249247 | A1 * | 10/2009 | Tseng et al. | 715/808 |
| 2009/0270027 | A1 * | 10/2009 | O'Neill | 455/15 |
| 2010/0197278 | A1 * | 8/2010 | Anderl | 455/412.1 |

* cited by examiner

*Primary Examiner* — Dwayne Bost
*Assistant Examiner* — Christopher Kohlman

(57) ABSTRACT

A system is provided for user interface update signaling. The system includes a user interface that executes on a mobile device, a signaling server, and a background application. The signaling server receives an update from a third party application and sends at least some of the update to the mobile device. The background application executes on the mobile device, receives the at least some of the update, and stores the at least some of the update in a file in the mobile device. The background application also provides a uniform resource locator that specifies where the file is located to the user interface to enable the user interface to display the at least some of the update.

18 Claims, 5 Drawing Sheets

USER INTERFACE UPDATE SIGNALING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A mobile device may communicate with third party applications via data sessions transmitted over a communications network. In contrast to desktop computers which may be connected to data sessions for extended periods of the time, a data session may be initiated each time that data is to be communicated between a mobile device and a third party application. However, the initiation of data sessions may not be efficient for communications between a mobile device and some third party applications. For example, a social network application may initiate a data session to send an update to a user's mobile device whenever another user in the user's social network provides an update. If the social network application initiates a data session for each of many updates to the user's mobile device, the user may be charged an additional amount for each of the many data sessions that provide the updates.

Alternatively, if the user initiates a web browser to request updates from the third party application, the user may occasionally forget to initiate the web browser and request updates for a significant period of time, thereby resulting in the user eventually viewing many stale updates that provide information that is no longer timely. If the user's mobile device periodically initiates a data session to request updates from the social network application, the periodic initiation of data sessions may occur too frequently or not frequently enough. If the other users in the user's social network provide many updates, the mobile device requesting updates from the social network application every two hours may result in receiving many stale updates long after the stale updates were available. If the other users in the user's social network provide few updates, the mobile device requesting updates from the social network application every two hours may result in initiating many data sessions for which no update is available, which also may result in the user being charged an additional amount for initiating each of the unnecessary data sessions. Furthermore, using many power intensive data sessions may result in quickly reducing the battery life for the user's mobile device.

SUMMARY

In some embodiments, a system is provided for user interface update signaling. The system includes a user interface and a background application that execute on a mobile device, and a signaling server. The signaling server receives an update from a third party application and sends at least some of the update to the mobile device. The background application receives the at least some of the update and stores the at least some of the update in a file in the mobile device. The background application also provides a uniform resource locator that specifies where the file is located to the user interface to enable the user interface to display the at least some of the update.

In some embodiments, a computer implemented method is provided for user interface update signaling. A mobile device receives at least some of an update from a third party application. The at least some of the update is stored in a file in the mobile device. A uniform resource locator that specifies where the file is located is provided to a user interface on the mobile device to enable the user interface to display the at least some of the update.

In some embodiments, a system is provided for user interface update signaling. The system includes a user interface and a background application that execute on a mobile device, and a signaling server. The signaling server receives an update from a third party application and sends an update notice to the mobile device. The background application receives the update notice and requests at least some of the update from the signaling server. The background application also receives the at least some of the update from the signaling server and stores the at least some of the update in a file in the mobile device. Additionally, the background application provides a uniform resource locator that specifies where the file is located to the user interface to enable the user interface to display the at least some of the update.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
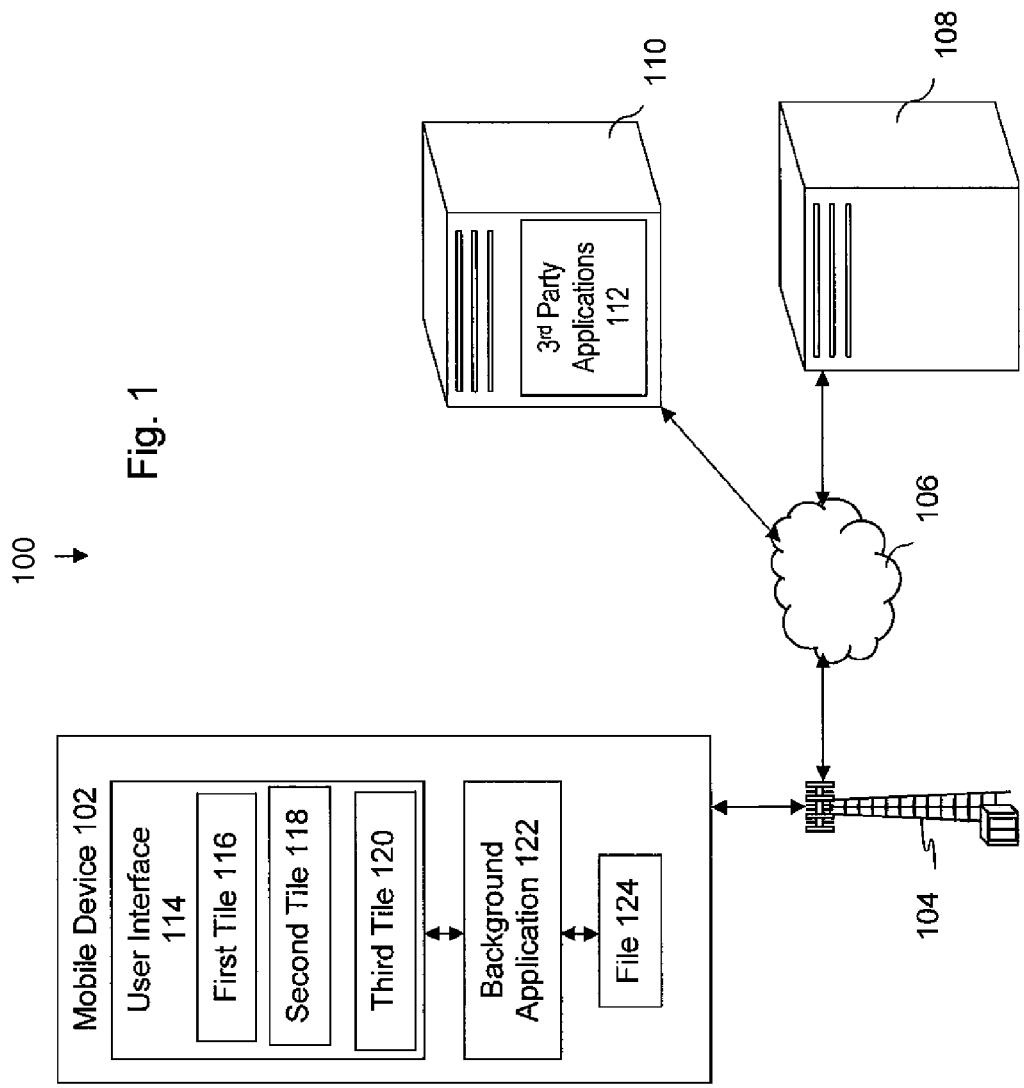
FIG. 1 shows a system for user interface update signaling according to some embodiments of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A mobile device may use a dynamic Internet protocol (IP) address every time a data session is initiated. Due to costs and availability, a communications service provider may lease only a limited number of dynamic IP addresses. When a dynamic IP address provided for a mobile device's data session has no data session activity for a 90 minute interval following the data session, or for some other effective time duration, a communications server may release the dynamic IP address back to a communications service provider's limited pool of available dynamic IP addresses. When the mobile device receives updates from a third party application using data sessions more frequently than every 90 minutes, the mobile device may retain its dynamic IP address for 90 minutes after each update to wait for additional updates. In this situation, the mobile device essentially has a static IP address, which may contribute to exhausting the communications service provider's pool of dynamic IP addresses. Acquiring additional dynamic IP addresses requires time and additional costs, and may be limited by the availability of dynamic IP addresses.

Systems and methods are provided for user interface update signaling. Instead of a third party application sending an update to a mobile device, the third party application sends the update to a signaling server. The signaling server receives the update and sends the update to the mobile device without initiating a data session for the mobile device. For example, the signaling server sends the update as an (SMS) message via the mobile device's wireless paging channel or via the mobile device's power signaling channel. A background application on the mobile device receives the update and stores the update in a file in the mobile device. The background application provides a uniform resource locator (URL) that specifies where the file is located to the user interface to enable the user interface to access and display the update. Instead of modifying the user interface to communicate with the background application, the background application provides the URL to the user interface which already has the capability of accessing data via URLs. However, because the URL specifies a location for a file that is on the mobile device, the user interface does not initiate a data session to access this local URL. Upon accessing the local URL, the user interface displays information that indicates the receipt of the update, such as an update receipt notice or the update itself.

In response to viewing the update receipt notice or the update itself, the user of the mobile device has the option of initiating a data session via the user interface to request data from the third party application. The mobile device user may view the update receipt notice or the update itself, decide that the update is important enough to initiate a data session, and select to initiate a data session via the user interface. When the data is received from the third party application, the mobile device may release the dynamic IP address to the communications service provider's pool of dynamic IP addresses because the mobile device is not waiting for additional updates or data via data sessions. Releasing the dynamic IP address increases the communications service provider's limited pool of IP addresses. The mobile device user may view the update receipt notice or the update itself and decide that the update is not important enough to initiate a data session. In this situation, the user saves the expense of initiating an unnecessary data session, the mobile device avoids an unnecessary data session that would unnecessarily further drain the battery of the mobile device, and the communications service provider's pool of available dynamic IP addresses is not reduced. Therefore, while avoiding modification of the user interface, the mobile device still receives information about updates in near real time without initiating a data session until the user decides to initiate the data session.

FIG. 1 shows a wireless communications system 100 for user interface update signaling according to some embodiments of the present disclosure. The system 100 includes a mobile device 102, a base transceiver station (BTS) 104, a network 106, a signaling server 108, and an application server 110 that executes third party applications 112. The mobile device 102 communicates with the servers 108-110 via the BTS 104 and the network 106. The third party applications 112 may include a social network application, a local weather application, a stock market application, a text message application, a web access application, an email application, a navigation application, a television application, a music application, and/or other application. The mobile device 102 includes a user interface 114, which includes a first tile 116, a second tile 118, and a third tile 120. The mobile device 102 also includes a background application 122 and a file 124.

Instead of one of the third party applications 112 sending an update to the mobile device 102, one of the third party applications 112 sends the update to the signaling server 108. The third party applications 112 may send the update in a text message or an email to a notification messaging account associated with the mobile device 102 and accessible by the signaling server 108. The third party applications 112 may send the update in response to an application programming interface call from the signaling server 108, which the signaling server 108 may send whenever the mobile device 102 checks for updates. The update may be a text message, an audio file, a photo file, a video file, or other. The signaling server 108 receives the update and parses header information in the update to identify the mobile device 102 addressed by the update. The signaling server 108 sends at least some of the update to the mobile device 102 without initiating a data session for the mobile device 102. For example, the signaling server 108 sends the update as an (SMS) message via a wireless paging channel for the mobile device 102. The signaling server 108 may respond to receipt of an update that is identified as urgent by sending the entire update to the mobile device 102 and may respond to receipt of an update that is identified as non-urgent by waiting for the mobile device 102 to request any updates before sending the update. The signaling server 108 may send only some of the update to the mobile device 102 if the update contains more information than the signaling server 108 may send without initiating a data session for the mobile device 102, such as when a social network application sends an update that includes a lengthy text message or a video file. For example, the signaling server 108 may send as much of a lengthy text message that an SMS message may include or a text description of a video file that the update includes, and retain the rest of the lengthy text message or the video file for subsequent retrieval as requested by the mobile device 102. Therefore, the amount of the update received from the third party applications 112 that the signaling server 108 sends as the update to the mobile device 102 may depend on the urgency and/or the file size of the update received from the third party applications 112.

The signaling server 108 may also send the update as a voice mail indicator message or a power setting message via a wireless paging channel or via a power signaling channel for the mobile device 102. For example, if the wireless paging channel for communicating SMS messages is currently unavailable for the mobile device 102, the signaling server 108 may send an update via one of the other wireless paging channels. If the signaling server 108 sends an update as a voice mail indicator message or a power setting message, the update may be an update notice rather than the update itself because of the limited amount of information that a voice mail indicator message or a power setting message may include relative to the amount of information that an SMS message may include. For example, the base transceiver station 104 may send a power setting message to the mobile device 102 to specify whether the mobile device 102 should use a level 1 power setting, a level 2 power setting, or a level 3 power setting to communicate via the base transceiver station 104 and the network 106. Continuing this example, if the signaling server 108 sends a level 3 power setting to the mobile device 102, the background application 122 may interpret this power setting message as an update notice based on the previous power setting message received from the base transceiver station 104. In another example, the signaling server 108 may send a sequence of power setting messages that the background application 122 interprets as an update notice.

If the background application 122 receives either an update notice or only some of an update, the background application 122 may request more of the update from the signaling server 108, receive more of the update from the signaling server 108, and store more of the update in the file 124. For example, if the background application 122 receives an update notice as a voice mail indicator message or a power setting message via a wireless paging channel for the mobile device 102, the background application 122 requests the signaling server 108 to send the update that corresponds to the update notice.

In another example, if the background application 122 receives a first portion of a lengthy text message as an SMS message via a wireless paging channel for the mobile device 102, the background application 122 requests the signaling server 108 to send the next portion of the lengthy text message. The background application 122 may continue requesting portions of the lengthy text message from the signaling server 108 until the background application 122 receives the entire lengthy text message that comprises the update, or the user of the mobile device 102 may indicate via the user interface 114 how much more of the update to request from the signaling server 108.

When the background application 122 receives the update, the background application 122 stores the update in the first file 124. The background application 122 provides a (URL) that specifies where the file 124 is located to the user interface 114 to enable the user interface 114 to display the update. Instead of modifying the user interface 114 to communicate with the background application 122, the background application 122 provides the URL to the user interface 114, which already has the capability of accessing data via URLs. However, because the URL specifies a location for the first file 124 that is on the mobile device 102, the user interface 114 does not initiate a data session to access this local URL.

Upon accessing the local URL, the user interface 114 displays information that indicates the receipt of the update, such as an update receipt notice or the update itself. The user interface 114 may include multiple tile applications, such as the first tile 116, the second tile 118, and the third tile 120. The tiles 116-120 are panes or individual screens that are viewable one by one, and perhaps in a specified order, on the display of the mobile device 102. The tiles 116-120 may contain actively running applications displaying viewable data and/or interactive content selected by a user of the mobile device 102. The data or interactive content may be dynamically refreshed without action by the user or changed at the user's discretion. The user may decide on the specific content to be displayed in each of the tiles 116-120, the order of the tiles 116-120 in a virtual carousel, and how long the tiles 116-120 remain in the carousel. The system 100 allows a user to create and download tiles for a single or short term use. Each of the third party applications 112 may send a corresponding update, and each of the tiles 116-120 may correspond to an update received from the third party applications. For example, if the first tile 116 is a social network tile, the first tile 116 may display information associated with a receipt of a social network update from a social network application, which is one of the third party applications 112. The first tile 116 may indicate receipt of an update corresponding to the first tile 116 by changing color, size, or shape, by changing the content displayed by the first tile 116, by an audio signal, and/or by vibrating the mobile device 102. For example, the first tile 116 may display a large red checkmark to indicate receipt of an update. In another example, the first tile 116 may display the update, which is comprised of a short text message that indicates that the user's daughter changed her social network application status from "happy" to "frustrated."

Displaying the update may be based on a user specified criteria. For example, the second tile 118 may be a local weather tile that corresponds to a weather application, which is one of the third party applications. The user may not want to receive an update from the weather application every time that the weather changes one degree for the geographic location specified by the user. Therefore, the user may request to receive weather updates once an hour, such that the second tile 118 receives weather updates in an SMS message send via a wireless paging channel for the mobile device 102 without initiating a data session for the mobile device 102. In another example, the user may request to receive updates for the third tile 120, which correspond to a stock market application, whenever the value of an identified stock or stock market index changes by a predetermined amount.

Upon viewing the indication of a receipt of an update, a user may use the tile that indicated the update to view more information about the update. Each of the tiles 116-120 may display at least some of a corresponding update in response to a first level of selection. For example, if the user of the mobile device 102 causes the selection device for the user interface 114 to "roll over" the first tile 116, the first tile 116 may change from displaying a red checkmark to displaying a social network update that indicates the user's daughter changed her social network status from "happy" to "frustrated." In another example, the first tile 116 may respond to a "roll over" by displaying a social network update that indicates the title of a video that the user's son posted on the social network.

The tiles 116-120 may display information associated with a corresponding third party application 112 in response to a second level of selection of the tile. For example, if the user of the mobile device 102 causes the selection device for the user interface 114 to select the first tile 116, the first tile 116 may display menu options to access the social network application. The user may select a menu option for the first tile 116 to initiate a data session to view the video posted by the user's son to the social network. If the user's son posted multiple videos, the user may select a menu option for the first tile 116 to initiate a data session to view some, but not all, of the videos posted by the user's son to the social network.

In response to viewing the update notice or the update, the user of the mobile device 102 has the option of initiating a data session via the user interface 114 to request data from one of the third party applications 112, such as a social network application. For example, the mobile device user may view the update, decide that the daughter's update is important enough to initiate a data session, and select to initiate a data session via the user interface 114 to determine if some additional information posted by the daughter via the social network application indicates why the daughter is frustrated. The user of the mobile device 102 has the option of selecting via the user interface 114 how much data to request from one of the third party applications 112. For example, the user may select to request additional information that the user's daughter has posted via the social network application during the most recent 24 hours instead of all of the information that the daughter has posted via the social network application during the most recent month that is currently accessible by other users.

When the data is received from one of the third party applications 112, the mobile device 102 may release the dynamic IP address to the communications service provider's pool of dynamic IP addresses because the mobile device 102 is not waiting for additional updates or data via data sessions. Releasing the dynamic IP address increases the communications service provider's limited pool of IP addresses.

In another example, the mobile device user may view the update and decide that the update identifying the son's video is not important enough to initiate a data session. In this situation, the user saves the expense of initiating an unnecessary data session, the mobile device avoids an unnecessary data session that would unnecessarily further drain the battery of the mobile device 102, and the communications service provider's pool of available dynamic IP addresses is not reduced. Therefore, while avoiding modification of the user interface 114, the mobile device 102 still receives information about updates in near real time without initiating a data session until the user decides to initiate the data session.

Figure 2:
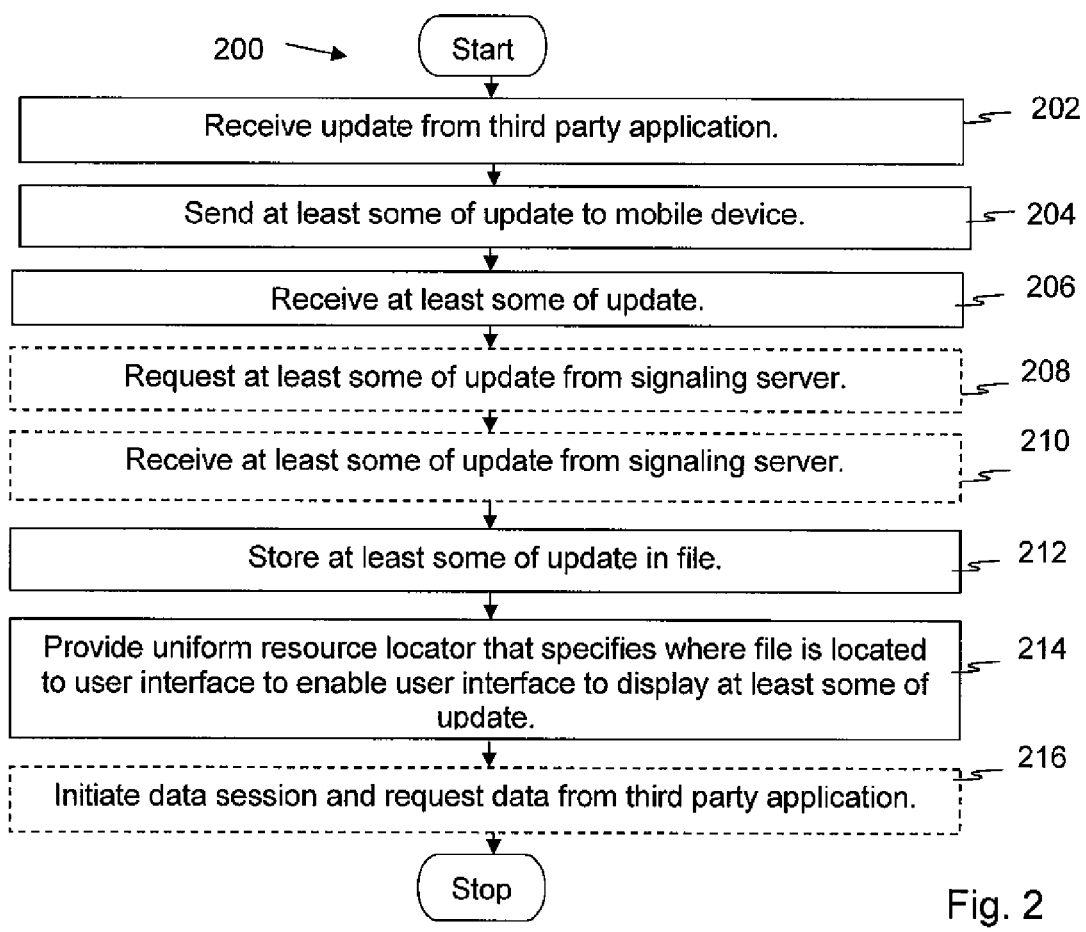
FIG. 2 is a flowchart for a user interface update signaling method according to some embodiments of the present disclosure.

FIG. 2 shows a flowchart of a method 200 for user interface update signaling according to some embodiments of the present disclosure. The system 100 may execute the method 200 to send a signal from the signaling server 108 to the mobile device 102 that indicates that an update is available from one of the third party applications 112 without initiating a data session.

In box 202, an update is received from a third party application. For example, the signaling server 108 receives updates from a social network application for the user's son and daughter.

In box 204, at least some of an update is sent to a mobile device. For example, the signaling server 108 sends the two updates to the mobile device 102.

In box 206, at least some of an update is received. For example, the background application 122 receives both updates.

In box 208, at least some of an update is optionally requested from a signaling server. For example, if the update received was an update notice or only part of an update, the background application 122 presents the option on the user interface 114 to request more of the update from the signaling server 108.

In box 210, at least some of an update is optionally received from a signaling server. For example, if the previously received update was an update notice or only part of an update, and the user selects the option to receive more of the update, the background application 122 receives more of the update from the signaling server 108.

In box 212, at least some of an update is stored in a file. For example, the background application 122 stores updates for the user's son and daughter in the file 124.

In box 214, a uniform resource locator that specifies where a file is located is provided to a user interface to enable the user interface to display at least some of an update. For example, the background application 122 provides a URL that specifies where the file 124 is located to the user interface 114 to enable the user interface 114 to display both updates.

In box 216, a data session is optionally initiated and data requested from a third party application. For example, although the user does not select to view the video posted via the social network application by the user's son, the user selects to request data from the social network application regarding the user's daughter, and the background application 122 initiates a data session and requests data from the social network application for the user's daughter.

Figure 3:
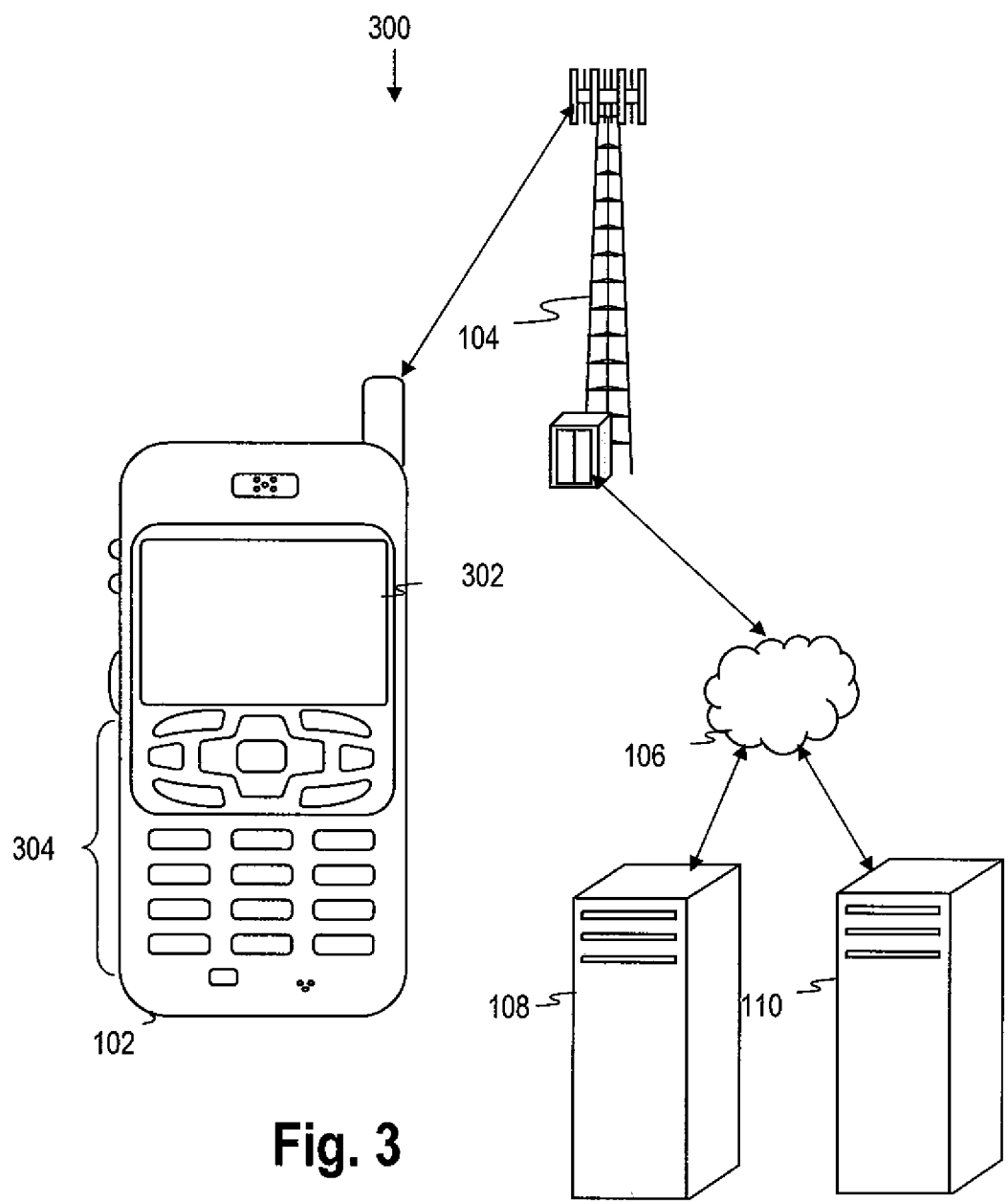
FIG. 3 shows another system for user interface update signaling according to some embodiments of the present disclosure.

FIG. 3 shows a wireless communications system 300 including the mobile device 102. FIG. 3 depicts the mobile device 102, which is operable for implementing aspects of the present disclosure, but the present disclosure should not be limited to these implementations. Though illustrated as a mobile phone, the mobile device 102 may take various forms including a wireless handset, a pager, a personal digital assistant (PDA), a mobile tele device, a mobile handset, a wireless mobile device, a gaming device, an inventory control device, a media player, a digital camera, a digital calculator, a digital music player, a personal computer, a mobile computer, a portable computer, a tablet computer, a laptop computer, and/or other. Many suitable mobile devices 102 combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 302 and a touch-sensitive surface or keys 304 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 104 to show a web page. The web page may be obtained via wireless communications with the BTS 104, a wireless network access node, a peer mobile device 102 or any other wireless communications network or system. While a single BTS 104 is illustrated, it is understood that the wireless communications system may comprise additional base transceiver stations. In some instances, the mobile device 102 may be in communications with multiple base transceiver stations 104 at the same time. The base transceiver station 104 (or wireless network access node) is coupled to the network 106 such as the Internet. Via the wireless link and the wired network, the mobile device 102 has access to information on various servers, such as the servers 108 and 110. The server 108 may provide content that may be shown on the display 302. Alternately, the mobile device 102 may access the BTS 104 through a peer mobile device 102 acting as an intermediary, in a relay type or hop type of connection.

Figure 4:
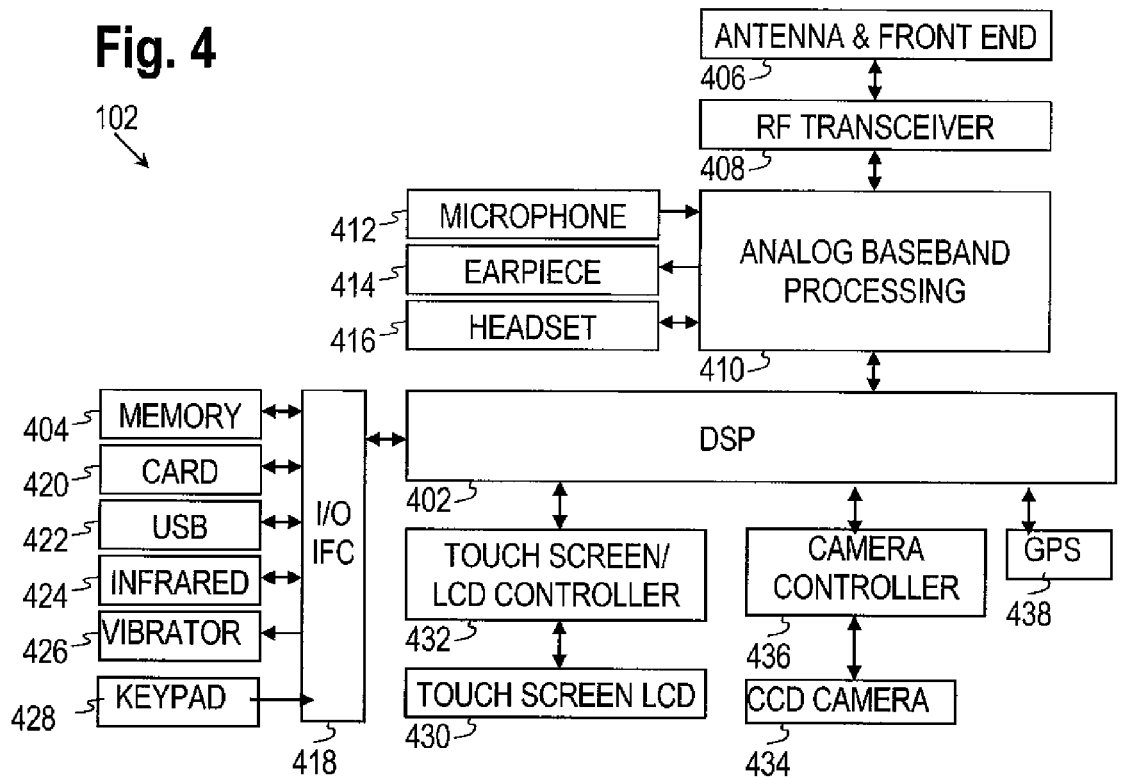
FIG. 4 shows a block diagram of an illustrative mobile device.

FIG. 4 shows a block diagram of the mobile device 102. While a variety of known components of mobile devices 102 are depicted, in an embodiment a subset of the listed components and/or additional components not listed may be included in the mobile device 102. The mobile device 102 includes a digital signal processor (DSP) 402 and a memory 404. As shown, the mobile device 102 may further include an antenna and front end unit 406, a radio frequency (RF) transceiver 408, an analog baseband processing unit 410, a microphone 412, an earpiece speaker 414, a headset port 416, an input/output interface 418, a removable memory card 420, a universal serial bus (USB) port 422, an infrared port 424, a vibrator 426, a keypad 428, a touch screen liquid crystal display (LCD) with a touch sensitive surface 430, a touch screen/LCD controller 432, a charge-coupled device (CCD) camera 434, a camera controller 436, and a global positioning system (GPS) sensor 438. In an embodiment, the mobile device 102 may include another kind of display that does not provide a touch sensitive screen. In an embodiment, the DSP 402 may communicate directly with the memory 404 without passing through the input/output interface 418.

The DSP 402 or some other form of controller or central processing unit operates to control the various components of the mobile device 102 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the mobile device 102 to send and receive information from a radio access network (RAN) or some other available wireless communications network or from a peer mobile device 102. In an embodiment, the antenna and front end unit 406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 406 may include antenna tuning and/or impedance matching components, RF power amplifiers, and/or low noise amplifiers.

The RF transceiver 408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 410 and/or the DSP 402 or other central processing unit. In some embodiments, the RF transceiver 408, portions of the antenna and front end 406, and the analog baseband processing unit 410 may be combined in one or more processing units and/or application specific integrated circuits (ASICs).

The analog baseband processing unit 410 may provide various analog processing of inputs and outputs, for example analog processing of inputs from the microphone 412 and the headset 416 and outputs to the earpiece speaker 414 and the headset port 416. To that end, the analog baseband processing unit 410 may have ports for connecting to the built-in microphone 412 and the earpiece speaker 414 that enable the mobile device 102 to be used as a mobile phone. The analog baseband processing unit 410 may further include a port for connecting to a headset or other hands-free microphone and speaker configuration. The analog baseband processing unit 410 may provide digital-to-analog conversion in one signal direction and analog-to-digital conversion in the opposing signal direction. In some embodiments, at least some of the functionality of the analog baseband processing unit 410 may be provided by digital processing components, for example by the DSP 402 or by other central processing units.

The DSP 402 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading, and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast Fourier transforming, and cyclic prefix appending, and for a receiver function the DSP 402 may perform cyclic prefix removal, fast Fourier transforming, deinterleaving, decoding, and demodulation. In other wireless technology applications, yet other signal processing functions and combinations of signal processing functions may be performed by the DSP 402.

The DSP 402 may communicate with a wireless network via the analog baseband processing unit 410. In some embodiments, the communications may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The USB port 422 may enable the mobile device 102 to function as a peripheral device to exchange information with a personal computer or other computer system. The infrared port 424 and other optional ports such as a Bluetooth interface or an IEEE 802.11 compliant wireless interface may enable the mobile device 102 to communicate wirelessly with other nearby mobile devices 102 and/or wireless base stations.

The input/output interface 418 may further connect the DSP 402 to the vibrator 426 that, when triggered, causes the mobile device 102 to vibrate. The vibrator 426 may serve as a mechanism for silently alerting the user to any of various events such as an incoming call, a new text message, and an appointment reminder.

The keypad 428 couples to the DSP 402 via the interface 418 to provide one mechanism for the user to make selections, enter information, and otherwise provide input to the mobile device 102. Another input mechanism may be the touch screen LCD 430, which may also display text and/or graphics to the user. The touch screen LCD controller 432 couples the DSP 402 to the touch screen LCD 430.

The CCD camera 434 enables the mobile device 102 to take digital pictures. The DSP 402 communicates with the CCD camera 434 via the camera controller 436. The GPS sensor 438 is coupled to the DSP 402 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 5:
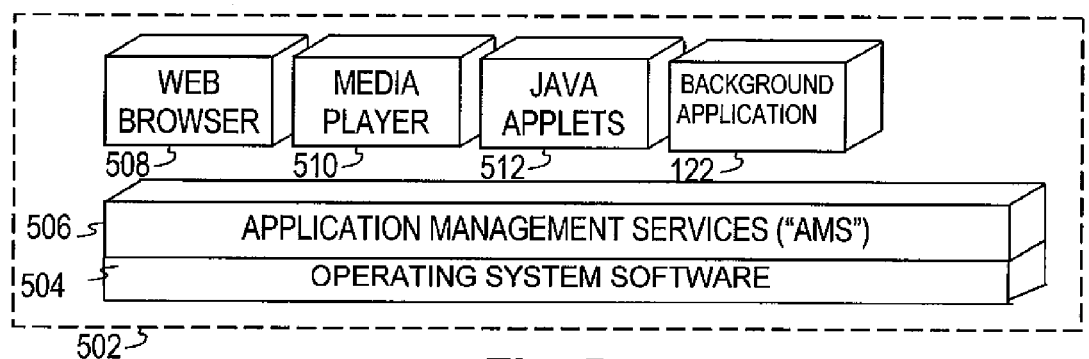
FIG. 5 shows a block diagram of an illustrative software configuration for a mobile device.

FIG. 5 illustrates a software environment 502 that may be implemented by the DSP 402. The DSP 402 executes operating system drivers 504 that provide a platform from which the rest of the software operates. The operating system drivers 504 provide drivers for the mobile device hardware with standardized interfaces that are accessible to application software. The operating system drivers 504 include application management services ("AMS") 506 that transfer control between applications running on the mobile device 102. Also shown in FIG. 5 are a web browser application 508, a media player application 510, JAVA applets 512, and the background application 122. The web browser application 508 configures the mobile device 102 to operate as a web browser, allowing a user to enter information into forms and select links to retrieve and view web pages. The media player application 510 configures the mobile device 102 to retrieve and play audio or audiovisual media. The JAVA applets 512 configure the mobile device 102 to provide games, utilities, and other functionality.

Figure 6:
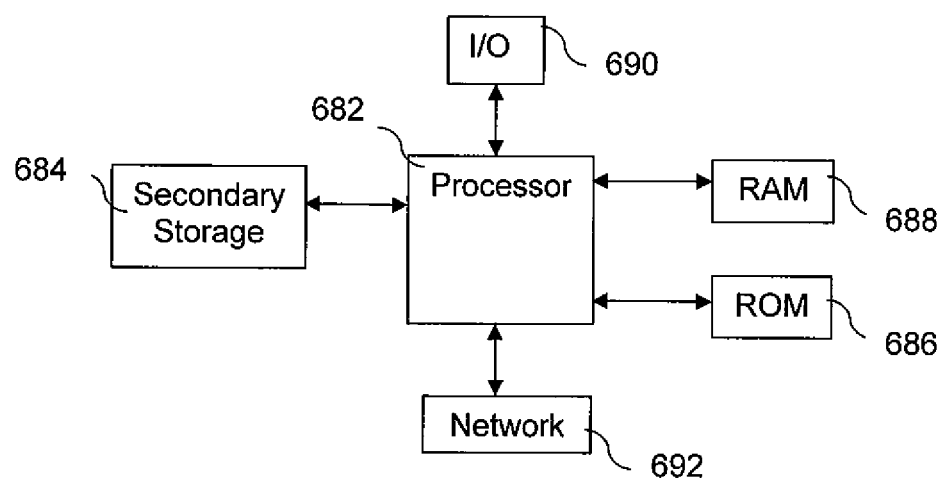
FIG. 6 illustrates an exemplary general purpose computer system suitable for implementing some aspects of the several embodiments of the disclosure.

Some aspects of the system described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 680 includes a processor 682 (which may be referred to as a central processor unit or CPU) that is in communications with memory devices including secondary storage 684, read only memory (ROM) 686, random access memory (RAM) 688, input/output (I/O) devices 690, and network connectivity devices 692. The processor 682 may be implemented as one or more CPU chips.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and other air interface protocol radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using the processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for user interface update signaling, comprising:
   a multi-tile user interface that executes on a mobile device, wherein the multi-tile user interface comprises a plurality of tiles on a display of the mobile device, wherein each of the plurality of tiles is an individual pane, and wherein the multi-tile user interface enables a user to specify a third party application for a tile of the plurality of tiles;
   a signaling server that receives an update from the third party application specified for the multi-tile user interface and sends at least some of the update to the mobile device via a wireless paging channel of the mobile device or a power signaling channel of the mobile device; and
a background application that executes on the mobile device, receives the at least some of the update from the signaling server without establishing a data session by receiving the at least some of the update via the wireless paging channel of the mobile device or the power signaling channel of the mobile device, stores the at least some of the update in a file in the mobile device, and provides a uniform resource locator that specifies where the file is located on the mobile device to the multi-tile user interface, wherein the multi-tile user interface displays the at least some of the update on the tile of the plurality of tiles upon accessing the uniform resource locator.

2. The system of claim 1, wherein the multi-tile user interface further initiates a data session and requests additional data related to the update from the third party application via the data session.

3. The system of claim 1, wherein the multi-tile user interface comprises a plurality of tiles in a carousel arrangement, wherein the tile associated with the at least some of the update displays information associated with a receipt of the at least some of the update.

4. The system of claim 3, wherein the information associated with the receipt of the at least some of the update comprises the at least some of the update.

5. The system of claim 3, wherein the tile displays the at least some of the update in response to a first level of selection of the tile.

6. The system of claim 5, wherein the tile displays information associated with a corresponding third party application of a plurality of third party applications that comprise the third party application in response to a second level of selection of the tile, wherein the plurality of third party applications comprise at least one of a social network application, a weather application, a stock market application, a news application, a text message interface application, a web access application, an email application, a navigation application, a television application, and a music application.

7. The system of claim 1, wherein the mobile device is one of a personal computer, a mobile telecommunications device, a mobile handset, a personal digital assistant, a mobile computer, a gaming device, a wireless mobile device, a pager, a portable computer, a tablet computer, a laptop computer, a media player, a digital camera, a digital music player, and a digital calculator.

8. The system of claim 1, wherein the signaling server further parses header information in the update to identify the mobile device.

9. A computer implemented method for user interface update signaling, comprising:
receiving, by a mobile device, at least some of an update from a third party application without establishing a data session by receiving the at least some of the update via a wireless paging channel of the mobile device or a power signaling channel of the mobile device, wherein the third party application is assigned to a tile of a plurality of tiles of a multi-tile user interface on a display of the mobile device, and wherein each of the plurality of tiles is an individual pane;
storing the at least some of the update in a file in the mobile device; and
providing a uniform resource locator that specifies where the file is located on the mobile device to the multi-tile user interface on the mobile device, wherein the multi-tile user interface displays the at least some of the update on the tile of the plurality of tiles upon accessing the uniform resource locator.

10. The computer implemented method of claim 9, further comprising:
requesting, by the mobile device, more of the update;
receiving the more of the update; and
storing the more of the update in the file in the mobile device.

11. The computer implemented method of claim 9, wherein receiving the at least some of the update comprises receiving the at least some of the update via a short message service message.

12. The computer implemented method of claim 9, wherein receiving the at least some of the update comprises receiving the at least some of the update via a voice mail indicator message.

13. The computer implemented method of claim 9, wherein receiving the at least some of the update comprises receiving the at least some of the update via a power setting message.

14. The computer implemented method of claim 9, wherein to display the at least some of the update is based on a user specified timing criteria for displaying updates on the tile of the multi-tile user interface corresponding to the update.

15. A system for user interface update signaling, comprising:
a multi-tile user interface that executes on a mobile device, wherein the multi-tile user interface comprises a plurality of tiles on a display of the mobile device, wherein each of the plurality of tiles is an individual pane, and wherein the multi-tile user interface enables a user to specify a third party application for a tile of the plurality of tiles;
a signaling server that receives an update from the third party application specified for the multi-tile user interface and sends an update notice to the mobile device via a wireless paging channel of the mobile device or a power signaling channel of the mobile device; and
a background application that executes on the mobile device, receives the update notice from the signaling server without establishing a data session by receiving the update notice via the wireless paging channel of the mobile device or a power signaling channel of the mobile device, requests at least some of the update from the signaling server, receives the at least some of the update from the signaling server, stores the at least some of the update in a file in the mobile device, and provides a uniform resource locator that specifies where the file is located on the mobile device to the multi-tile user interface, wherein the multi-tile user interface displays the at least some of the update on the tile of the plurality of tiles upon accessing the uniform resource locator.

16. The system of claim 15, wherein the signaling server sends the update notice to the mobile device via a short message service message.

17. The system of claim 15, wherein the signaling server sends the update notice to the mobile device via a voice mail indicator message.

18. The system of claim 15, wherein the signaling server sends the update notice to the mobile device via a power setting message.

* * * * *